Figure 3:
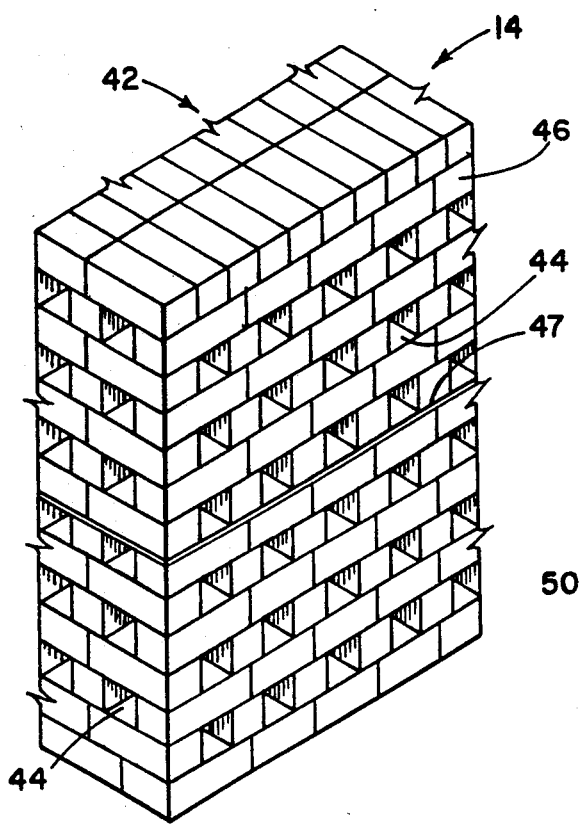

United States Patent [19]

Chaney

[11] Patent Number: 5,191,930

[45] Date of Patent: Mar. 9, 1993

[54] HEAT REGENERATOR

[76] Inventor: Ross P. Chaney, 5233 W. Timberwood Dr., Newburgh, Ind. 47630

[21] Appl. No.: 702,966

[22] Filed: May 20, 1991

[51] Int. Cl.$^5$ .............................. F28D 17/02
[52] U.S. Cl. .......................... 165/4; 165/10; 431/11; 431/215; 431/240
[58] Field of Search ............... 165/4, 10; 431/11, 215, 431/240

[56] References Cited

U.S. PATENT DOCUMENTS

| | | | |
|---|---|---|---|
| 1,688,700 | 10/1928 | Gauss | 165/4 |
| 1,739,507 | 12/1929 | De Lorenzi | 165/4 |
| 3,225,819 | 12/1965 | Stevens | 165/4 |
| 4,966,228 | 10/1990 | Fawcett | 165/4 |

Primary Examiner—Albert W. Davis, Jr.
Attorney, Agent, or Firm—Clifford A. Poff

[57] ABSTRACT

A gas regenerator is provided having for the clean air a set of two adjacent parallel flow paths having hot and cold ends, and for the waste gas a set of two adjacent parallel different flow paths, having hot and cold ends, the air and waste gas being separated while passing through the mass storage and heat transfer material of the regenerator, valves arranged only at the cold ends of the flow paths are adapted to be selectively positioned for allowing the flow paths of each set to be alternately selected, and in which the different sets of flow paths are arranged perpendicularly or at another overlapping desired angle to each other.

7 Claims, 4 Drawing Sheets

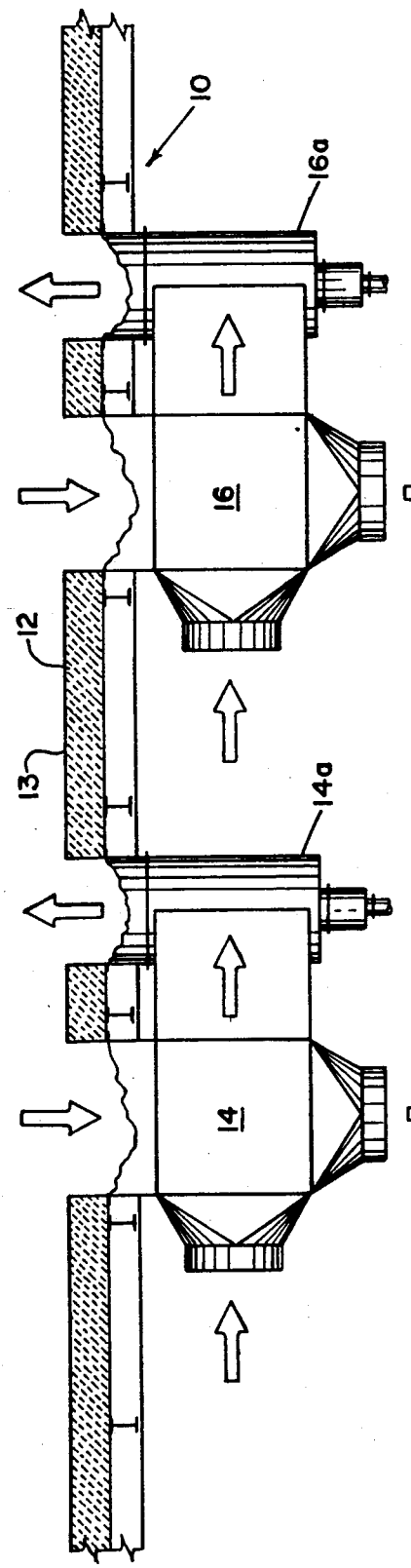
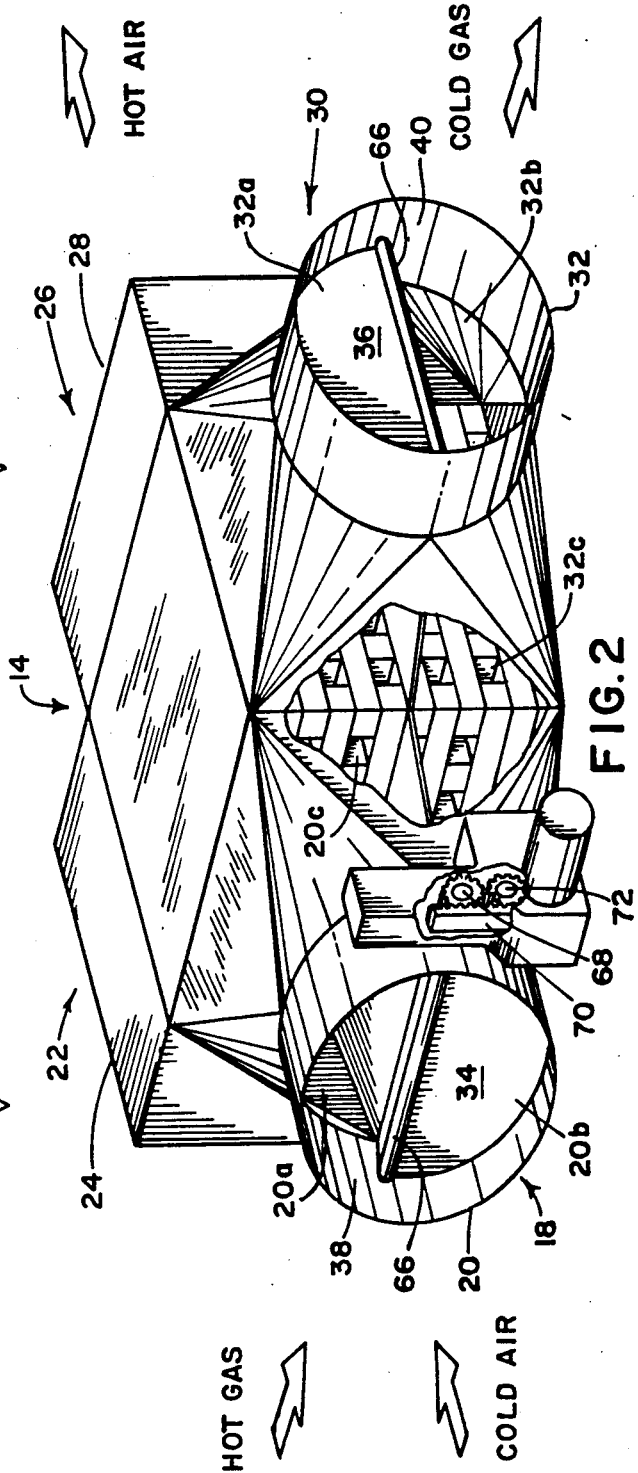

HEAT REGENERATOR

BACKGROUND OF THE INVENTION

This invention relates to heat exchangers, particularly of the type known as heat regenerators and recuperators. While not so limited, the preferred use of the invention is in connection with industrial furnaces such as, for example, open-hearth furnaces, coke ovens, soaking pits, batch-type and continuous heating, reheating, heat treating and melting furnaces, as they relate to the steel, aluminum, glass, refractory and other industries. In such industries exchangers are sometimes referred to as air pre-heaters.

To refer, for the purpose of background, to but one prior use of regenerators, it is a common use to provide in a billet reheating furnace a number of burner units that are designed and arranged to serve alternatively as burners and as regenerators. As burners, the units supply the necessary heat in the form of combustible fuel gas to the furnace, as regenerators they remove hot waste gas from the furnace. Thus, for a given set of units, one unit while serving as a burner is fed clean preheated air from the second unit, which air has been heated to a desired temperature from the hot waste gas removed from the furnace. Some of the features of this burner arrangement can be seen from U.S. Pat. Nos. 4,358,268 and 4,756,688. The design and arrangement just described is not only expensive from a "Machinery Cost Standpoint " but also from a maintenance point of view, not to mention the very elaborate piping-valve-control system cost and in some instances the necessity of arranging the valves of the regenerator on the "hot" side or end of the units.

In addition to the aforesaid U.S. Patents, prior U.S. Pat. Nos. 1,688,700, 3,207,493 and 4,349,069 may serve as background for the present invention. Briefly commenting on these patents in reverse order, the 069 patent is of interest, among other things, in illustrating the use of valves at the "hot end" of a regenerator. The 493 patent shows in combination with a furnace chamber, the alternate operation of a two single flow path regenerator, while the 700 patent illustrates an air regenerator having two single flow paths in two separate chambers and having valves at both the "hot" and "cold" ends of each chamber. The designs represented by each of these last referred to prior art patents possess and are subject to more or less the same disadvantages and objections noted above as to the designs of the U.S. Pat. No. 4,358,268 and U.S. Pat. No. 4,756,688 patents. In addition, some of the designs, namely the 700 patent, require a purging of the system before the change from the hot input flow path to the cold input flow path and the necessary interruption in the operation of the regenerator when this is accomplished.

SUMMARY OF THE INVENTION

The present invention relates to a fluid heater and has for its object providing a heat exchanger having at least two alternate cold fluid flow paths and at least two alternate hot fluid flow paths.

More particularly, the present invention has for its object to provide a heat regenerator, wherein the aforesaid sets of alternate flow paths are arranged in a cross feed manner so that when a valve or valves are positioned to allow one of the cold flow paths to be employed, the valve or valves that allow alternate use of the hot flow paths are positioned to transfer stored heat to the cold flow.

Another object of the present invention, as expressed in the aforesaid objects, is to provide either one or more valves for each set of alternate flow paths, in which the valves employed to control the alternate flow paths may be arranged at the cold ends of the flow paths.

A still further object of the present invention, as referred to above, is to provide a hot air regenerator, wherein the sets of flow paths consist of two flow paths for each set and in which the sets of flow paths are arranged perpendicular to each other, and wherein means are provided to continuously separate the incoming cold air to be heated from the incoming hot waste gas employed to transfer its heat to the mass heat storage and transfer means of the regenerator and hence to the incoming cold air.

Another object of the present invention, in employing certain features of the regenerator described above, is to provide a regenerator arrangement comprising of two or more cooperative regenerators arranged to feed hot clean fluid to a common source, such as a burner, in which one cooperative regenerator operates alternately to store heat from and then to transfer heat to a fluid and the other cooperative regenerator operates in reverse order, whereby the regenerators continuously supply hot clean fluid to the burner so long as cold and waste fluids are continuously fed to the regenerators.

BRIEF DESCRIPTIONS OF DRAWINGS

Figure 4:
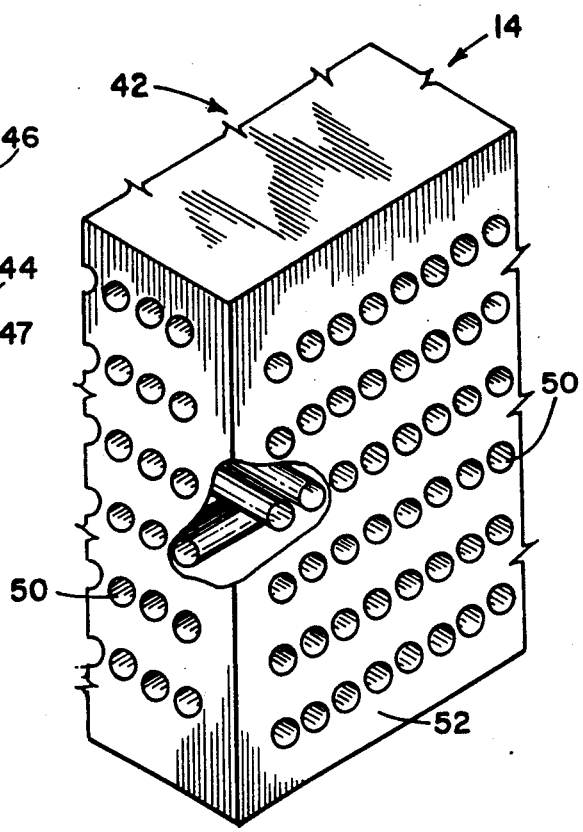
Figure 7:
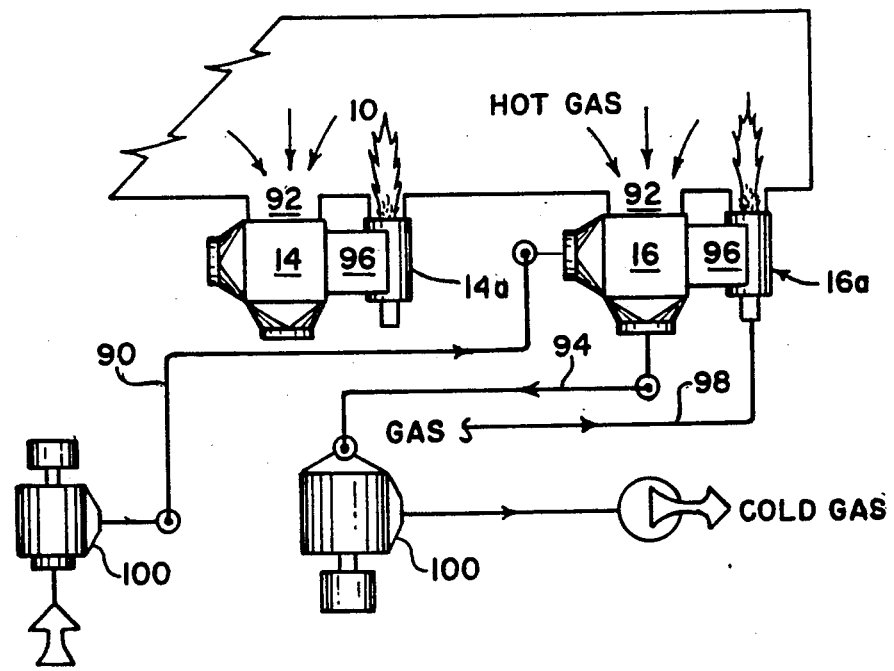
Figure 5:
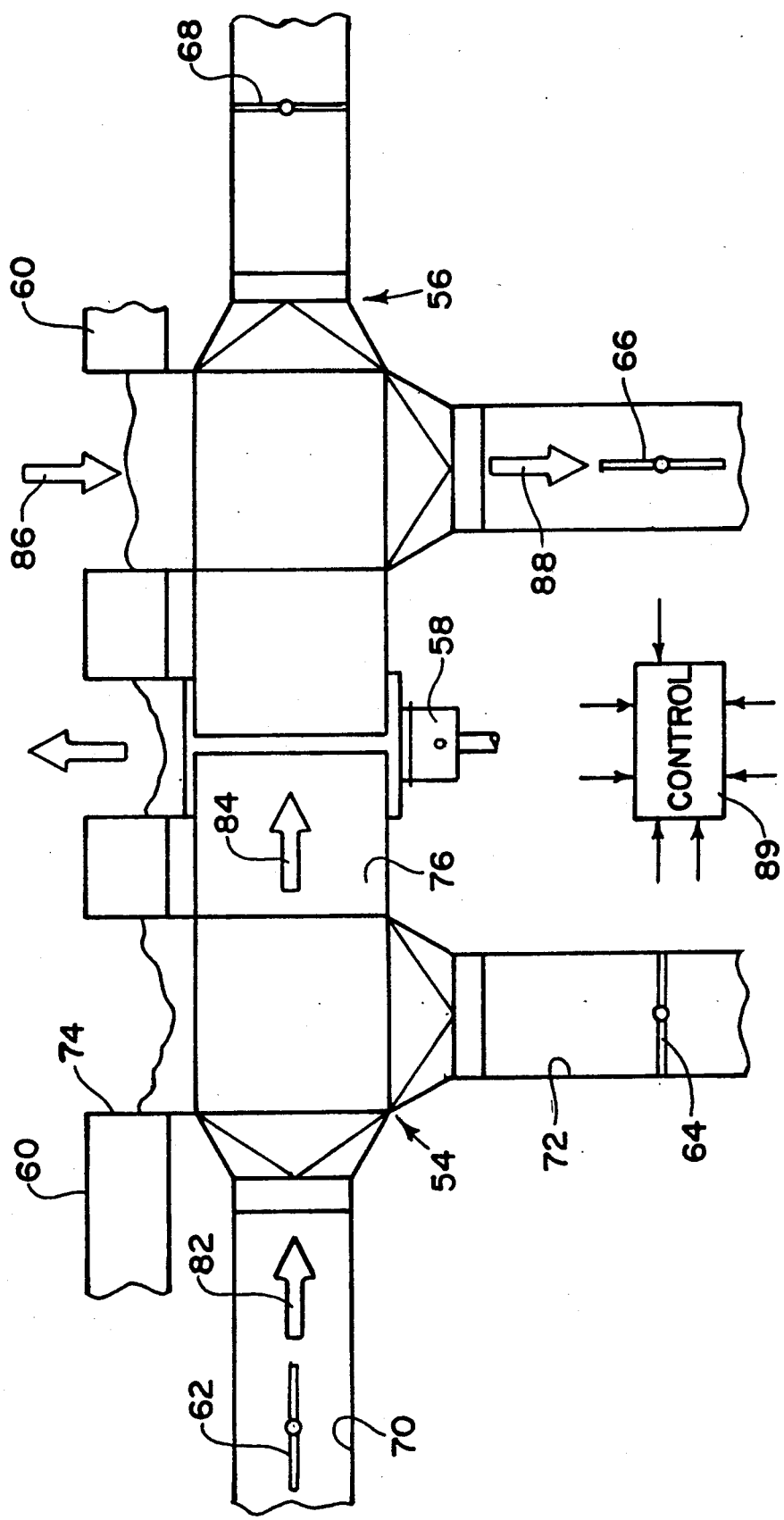
Figure 6:
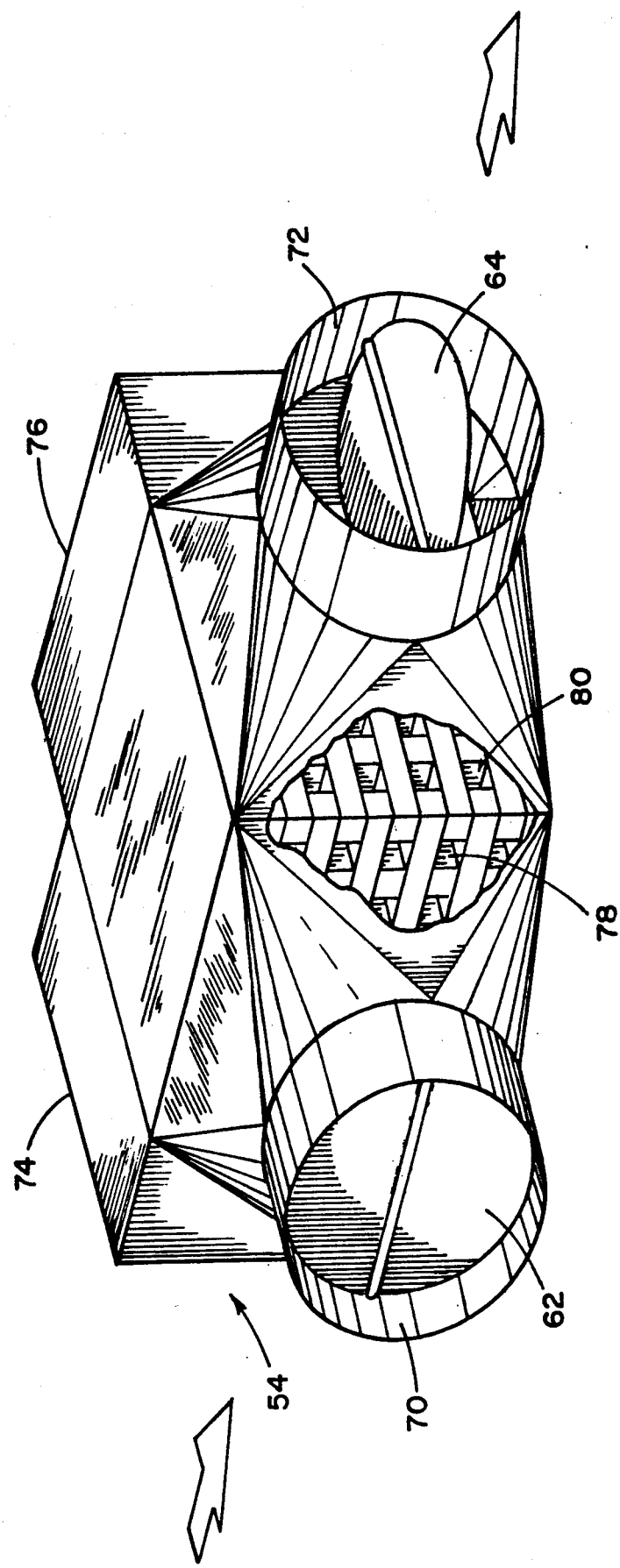

The above objects and other advantages of the present invention will be better appreciated when the following description of the invention is read along with the accompanying drawings of which:

FIG. 1 is a schematic plan view of a portion of a steel billet reheating furnace incorporating two burner-regenerator units constructed in accordance with the present invention, FIG. 2 is a perspective view of one of the regenerators illustrated in FIG. 1, FIG. 3 is a simplified perspective view of one form of the flow passageways and storage mass and heat transfer construction of the regenerator illustrated in FIG. 2, FIG. 4 is a simplified perspective view of a second form of the passageways and storage mass and heat transfer construction of the regenerator illustrated in FIG. 2, FIG. 5 is a plan layout view of a second embodiment of a dual regenerator arrangement constructed in accordance with the present invention, FIG. 6 is a simplified perspective view of one of the regenerators shown in FIG. 5, and FIG. 7 is a simplified piping schematic view for one of the regenerators shown in FIG. 1.

DESCRIPTION OF THE INVENTION

With reference to FIG. 1, there is shown a portion of a well known reheating furnace 10, including a portion of one of its perimeter vertical walls 12, through which the nozzle portions of two spaced apart burner - regenerator units 14 and 16 are mounted, the burners being indicated at 14a and 16a, the units 14 and 16 being constructed in accordance with the teaching of the present invention. It will be appreciated that a number of the units 14 and 16 will be normally employed in the opposite walls of the furnace 10, and that by virtue of the present invention the total number of the required units may be reduced in half since there will be no need to operate the burner units in two separate modes of a burner to supply heat to the furnace and alternately as the means for removing flue gas from the furnace.

FIG. 2 best shows some of the details of the preferred form of the regenerator units 14 and 16 and since they are identical only the unit 14 will be described. As noted above, the present invention provides a heat exchanger for two or more fluids, for example, air and flue gas, in which two or more flow paths are created for both the hot incoming waste gas and the cold incoming clean air, the flow paths of each set being separated from each other and the flow paths of the respective sets being separated. As used herein, the reference to clean air will be understood to include an air-flue gas mixture. Also as noted before is the fact that the sets of flow paths are arranged generally perpendicularly to each other as seen in FIG. 2, although, it will be appreciated that the flow paths, if desired, can be arranged at any other convenient overlapping or crossing angles. What is important is to provide a relatively large and effective surface area for heat absorption and heat transfer. Also the construction insures that the gas and air will pass over the entire heat surface of the absorbing and transferring means in the opposite chamber of the other flow path.

In FIG. 2 the side 18 forms the incoming flow opening 20 for the clean cold air brought to the regenerator 14 by a conduit, not shown. The side 22 of the regenerator forms the incoming flow opening 24 for the hot flue waste gas brought to the regenerator by a conduit, not shown. It follows from this that the side 26 forms the discharge opening 28 for the hot clean air and the side 30 forms the discharge opening 32 for the cold flue gas.

With reference to the clean air openings 20 and 28, it is made into two identical sized flow paths or chambers 20a and 20b, each path being made up of individual passageways 20c that are formed of the mass heat storage and transfer material of the regenerator, which for simplicity is not shown in FIG. 2, and which passageways pass in an uninterrupted manner through the regenerator. The identical construction is employed for the flue gas openings 24 and 32, in which their two flow paths 32a and 32b are provided with passageways 32c.

The openings 20 and 32, it will be noted, are the "cold" ends of the flow paths, the opposite ends being the "hot" ends. Having the valves arranged at the "cold" ends allows the obtaining of the well known advantages, such as, simplification of material selection for the valves and their operating elements, as well as reduced maintenance costs. At each of the cold ends similar valves 34 and 36 are pivotally mounted in the cylindrically shaped walls 38 and 40 of the openings. The valves, which can be of any suitable shape to cooperate with the shape of the openings, being arranged at the vertical center of the openings and having a height and width substantially identical to the openings allow, depending on which of the valves 34 and 36 are in their "up" or "down" positions, the opening up or closing off of one of the flow paths of chambers 20a, 20b and 32a, 32b.

As shown in FIG. 2, when the valve 34 is in its "down" position, clean cold air is allowed to flow into the upper passageways 20a and its chamber and blocked from passing through passageway 20b and its chamber, and while valve 36 is in its "up" position hot flue waste gas will be allowed to flow into the lower passageway 32b and blocked from passing through passageway 32a. When the stored heat of the chamber 20b which has taken on heat has reached a desired temperature level, and the temperature of the chamber presently given up its heat falls below a desired temperature, the reversal of the valves may take place to bring into play the two previously blocked chambers 32a to allow a continuous and even heating of the incoming cold air.

While not shown in FIG. 2, it will be understood that the hot ends of the flow paths 24 and 28 ar not provided with any valving and hot flue gas in the one case and hot clean air in the other case flow through unrestrictedly the entire openings 24 and 28. It will be recognized, however, that in certain applications it may be desirable to place valving in the hot ends instead of the cold ends, in which case the cold flue gas and cold clean air will flow unrestrictedly through openings 24 and 28. The cross flow arrangement for each medium, each having two separate properly sealed paths just described, permit the continuous heating of the cold air.

The valves 34 and 36 may take a number of different forms for selectively blocking the flow of air and gas, such as replaceable plates that move strictly horizontally or vertically or other forms shown in some of the aforesaid prior art patents. Also the heating of the clean cold air can be for all practical purposes continuous as long as air and gas are being fed to the regenerator. Even when the blocking means or dampers are not made to operate very quickly, it will be noted that in employing, for example, rotatable valves of the type shown at 34 and 36 a continuous flow is maintained. As the flow is decreased in one chamber on rotating the valve to close the chamber, an equal amount of flow will begin to flow in the other cooperative chamber, which two flows will progressively change in equal degrees in opposite directions until the original open chamber is completely closed and the original closed chamber is completely opened.

As indicated by the prior art patents referred to above, the detail designs, selection of materials, size and capacity of the regenerator may follow present day well known technology and will depend on the particular applications of the heat regenerator. Two examples of different constructions of the mass storage and heat transfer means are illustrated in FIGS. 3 and 4. In application where the fluid is to be heated to high temperatures of, for example, 2500° F., the traditional heat absorbing means such as ceramics or clay - silicon - carbide materials can be used to form the required mass heat storage and flow passageways. As is customary in such heat regenerator systems, the gas and air are always kept separated as they pass through the systems. Such a construction is schematically shown in FIG. 3, which illustrates the interior 42 of the regenerator 14, where the passageways 44 are formed by ceramic material 46 with a well known sealer 47 only indicated schematically.

The type of regenerator system of FIG. 3, is very suitable for large burners applications or where several burners are supplied through a single regenerator of the type described above. In applications where smaller burners and hence smaller regenerators can be employed, the heat transfer material can be formed by a single piece with the two separate flow paths. In FIG. 4, which indicates a second interior 48, in applications involving lower temperatures, for example 1500° F., seamless stainless steel tubing 50, which is inherently sealable, can be employed mounted in suitable well known refractory material 52.

With reference to the embodiment of FIGS. 5 and 6, there is illustrated a system of employing two co-operative regenerators 54 and 56 for feeding a common burner 58 of a furnace 60 by use of four co-operating valves 62, 64, 66 and 68. In FIG. 5, the regenerators 54 and 56 are arranged in line, the regenerator 54 having a cold clean air input conduit 70, into which a open-close type valve 62 is arranged, and a cold flue gas output conduit 72, into which a second open-close type valve 64 is located on the side opposite of the furnace 60, the regenerator 54 having a hot gas unvalved opening 74 On the side opposite the conduit 70, the regenerator 54 has a second unvalved opening 76, which communicates with and supplies clear air to the burner 58. The regenerator 56 is identical, but opposite hand, to the regenerator 54, so that its elements will not be further described, aside from noting that its clear air non-valve opening communicates with and supplies clear air to the burner 58, when its clear air valve 68 is open and the opposite valve 62 is closed.

Turning now to FIG. 6, there is shown the regenerator 54 by itself, in which it will be understood follows the general construction of the regenerator 14, although the mass storage and heat transfer material can be a single piece type. The regenerator 54 differs in two basic respects. The regenerator 54 has only one clear air and one flue gas systems formed by the discrete passageways of each of the systems, which is indicated by legends 78 and 80, respectively, the discrete passageways being staggered or offset in the vertical direction, as one views FIG. 6. Thus, the passageways of each system are not divided into equal and separate portions as in the regenerator 14. The gases of each system in the regenerator 54 pass through each passageway network when the controlling associated valve is operated to allow this. Another difference of the regenerator 54 is the fact that the valves employed for the regenerator are made to entirely open or close the conduits with which they are associated, whereas in the regenerator 14 the valves open one half of the conduits and automatically close off the other half.

Returning to FIG. 5, the arrow 82 associated with the conduit 70 indicates that clear cold air is being allowed in the regenerator 54 due to the valve 62 being open, in which the regenerator 54 is in its heat transfer mode. By the same token, the valve 64 associated with the conduit 72 being closed will hold hot gas being fed from the furnace 60 through open 74 in the regenerator. As a result, and as indicated by the arrow 84, clear hot air is fed to the burner 58 through the opening 76 of the regenerator 54. While this is occurring, the regenerator 56 is in its regenerating mode, meaning that the clear air valve 68 is closed and the cold ga valve 66 is open as indicated by arrows 86 and 88 and the indicated positions shown for the valves 66 and 68. The burner 58, accordingly, is continuously supplied clean hot air by the alternate operation of the two cooperative regenerators 5 and 56 and the selective cooperative operation of their associated valves. A well known type control 89 may be employed to automatically operate the valving by temperature monitoring taken, for example, at the output hot clean air openings 76, FIG. 5 indicating that the control has three output position signals received from the valves and four temperature input signals received from the various openings of the regenerators 54 and 56.

With reference now to FIG. 7, there is illustrated a "piping" schematic for the regenerator 16, it being understood that a similar system will be provided for the unit 14, and that this unit will operate simultaneously with the unit 16, and that the components identified are generally well known elements. In FIG. 7, the regenerator 16 has an input line 90 for the clean input air, and a conduit 92 for the hot waste gas, and one output line 94 for the cold waste gas and a conduit 96 for the hot clean air being fed to the burner. A line 98 is shown for the fuel of gas being fed into the burner 16a. In the line 90 a blower 100 is provided which receives combustion air and in line 94 an exhaust blower 100 is provided. Returning to FIG. 2, the controls and the rotating system for the valves 34 and 36, may include for each valve a rotatable shaft 66, a pinion 68, rack 70 and input drive shaft 72, although the power means is not shown, whereas the controls may follow well known designs and components for alternately delivering the combustion air to the burners to fire the furnace.

From the above description, it can be seen that a regenerator built in accordance with the present invention will provide for improved efficiency, require no purging or interruption of operation, will be inexpensive to manufacture and operate, being very compact for a given capacity and having a much greater capacity for a given size, in which the number of valves needed are reduced to a minimum and greatly simplified, and wherein the valves can be arranged at the cold ends of all flow paths.

Although the invention has been shown and/or described in connection with certain specific embodiments, it will be readily apparent to those skilled in the art that various changes in parameters can be made to suit requirements without departing from the spirit and scope of the invention. Also, while the present invention has been disclosed in connection with a regenerator, as noted, it may be used for other known types of fluid heat exchangers, such as recuperators and other fluid heaters.

I claim:

1. A heat regenerator comprising an outer encasing means,
    said encasing means including means for forming at least two fluid input openings and at least two fluid output openings,
    different said input and output openings forming part of two different continuous fluid flow paths directionally substantially straight through said encasing means,
    said different flow paths also formed by at least a first and second discrete fluid path system and wherein said different flow paths have a cross relationship to each other in said fluid path systems sufficient to effect a heat transfer through said fluid path systems from one fluid path system to the other fluid path system,
    valve means for selectively opening and closing each said different flow path of said fluid path systems,
    said valve means include means for alternately opening a portion of an associated said opening and at the same time closing a different portion of the same said associated opening,
    a cooperative one of said input and output openings associated with said first fluid path system receiving and discharging, respectively, a first fluid to which heat is to be transferred,
    a cooperative one of said input and output openings associated with said second fluid path system receiving and discharging, respectively, a second fluid which is to surrender heat, means in said fluid path systems through which said flow paths pass for providing mass storage and heat transfer for said fluids, the relationship of said different flow paths being such that said first fluid passing through said first fluid path system is exposed to the heat of said second fluid path system, through which said second fluid passes, upon selectively positioning of said valve means in a manner to effect a substantial continuous transfer of heat from said second fluid through said mass storage and heat transfer means to said first fluid on the continuous flow of said fluids into said input openings.

2. A heat regenerator according to claim 1, wherein said valve means further includes means for dividing each said opening associated with said valve means into two substantially equal portions in a manner to form discrete similar sections of each fluid path system, and means for selectively positioning said valve means to alternately open and at the same time closing a portion of an associated flow path.

3. A heat regenerator according to claim 1, wherein said first fluid is at least partly clean air and said second fluid is waste gas.

4. A heat regenerator according to claim, wherein said valve means are arranged to divide their associated fluid paths in substantially identical said fluid path systems.

5. A heat regenerator according to claim 1, wherein said separate flow paths each have cold input and hot output ends, said valve means arranged at said cold end of said input end of said flow path for said first fluid, and a said valve means arranged at said cold end of said output end of said flow path for said second fluid.

6. A heat regenerator according to claim 1, wherein said mass storage and heat transfer means includes means for separating said first fluid from said second fluid while passing through their associated fluid path systems.

7. A heat regenerator according to claim 1, wherein said cross relationship takes the form of said different flow paths being arranged generally perpendicularly to each other in the same common plane substantially containing said openings.

* * * * *